(12) United States Patent
Chen et al.

(10) Patent No.: US 12,260,110 B2
(45) Date of Patent: Mar. 25, 2025

(54) MANAGING TRIM COMMANDS IN A MEMORY SUB-SYSTEM

(71) Applicant: Micron Technology, Inc., Boise, ID (US)

(72) Inventors: Yueh-Hung Chen, Sunnyvale, CA (US); Fangfang Zhu, San Jose, CA (US); Horia Simionescu, Foster City, CA (US); Chih-Kuo Kao, Fremont, CA (US); Jiangli Zhu, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/529,868

(22) Filed: Dec. 5, 2023

(65) Prior Publication Data

US 2024/0103752 A1 Mar. 28, 2024

Related U.S. Application Data

(63) Continuation of application No. 17/462,629, filed on Aug. 31, 2021, now Pat. No. 11,868,642.

(51) Int. Cl.
*G06F 3/06* (2006.01)
(52) U.S. Cl.
CPC .......... *G06F 3/0652* (2013.01); *G06F 3/0604* (2013.01); *G06F 3/0679* (2013.01)
(58) Field of Classification Search
CPC .... G06F 3/0652; G06F 3/0604; G06F 3/0679; G06F 3/061; G06F 3/064
See application file for complete search history.

(56) References Cited

U.S. PATENT DOCUMENTS 9,229,863 B2 * 1/2016 Yoshihashi ......... G06F 12/0804
10,430,124 B1 * 10/2019 Hwang ................ G06F 3/064
(Continued)

FOREIGN PATENT DOCUMENTS

AU       2016393275 A1      8/2018
WO    WO 2017/139973 A1 *  8/2017  ............. G06F 12/02

OTHER PUBLICATIONS

Farooq U., "What is Hardware Acceleration and When Should You Use It," 2021, 9 Pages, Retrieved from the Internet: URL:https://www.makeuseof.com/what-is-hardware-acceleration.
(Continued)

*Primary Examiner* — Christopher D Birkhimer
(74) *Attorney, Agent, or Firm* — Lowenstein Sandler LLP

(57) ABSTRACT

Disclosed is a system comprising a memory device and a processing device, operatively coupled with the memory device, to perform operations including identifying a group of memory cells corresponding to a first range of logical block addresses (LBAs). The operations performed by the processing device further include receiving a memory access command with respect to the group of memory cells. The operations performed by the processing device further include responsive to determining that a data structure associated with the group of memory cells references a second range of LBAs, blocking the memory access command; responsive to determining that the first range of LBAs does not include each LBA of the second range of LBAs, performing, on the group of memory cells, a trim operation; and responsive to determining that the data structure indicates the completion of the trim operation, performing a memory access operation specified by the memory access command.

20 Claims, 5 Drawing Sheets

(56) References Cited

U.S. PATENT DOCUMENTS

| | | | | |
|---|---|---|---|---|
| 10,503,416 | B1* | 12/2019 | Himelstein | G06F 3/065 |
| 2013/0060989 | A1* | 3/2013 | Aune | G06F 3/0659 |
| | | | | 711/170 |
| 2015/0106410 | A1* | 4/2015 | Zaltsman | G06F 16/1847 |
| | | | | 707/824 |
| 2015/0234849 | A1* | 8/2015 | Ki | G06F 3/0638 |
| | | | | 707/695 |
| 2018/0107400 | A1* | 4/2018 | Tsai | G06F 3/064 |
| 2019/0042405 | A1* | 2/2019 | Boyle | G06F 12/0246 |
| 2019/0294341 | A1* | 9/2019 | Sunata | G06F 3/064 |
| 2021/0141943 | A1* | 5/2021 | Van Leeuwen | H04L 9/0643 |
| 2021/0303457 | A1* | 9/2021 | Pasquale | G06F 3/064 |

OTHER PUBLICATIONS

Kim Y., et al., "CPU-accelerator Co-scheduling for CNN Acceleration at the Edge," IEEE Access, 2020, vol. 8, 12 Pages, Retrieved from the Internet: URL:https://ieeexplore.ieee.org/stamp/stamp.jsp?tp=&arnumber=9264125.

Omura T., "Using Hardware Acceleration to Increase NVMe Storage Performance," 2020, 6 Pages, Retrieved from the Internet: URL:https://www.techtarget.com/searchstorage/post/Using-Hardware-Acceleration-to-Increase-NVMe-Storage-Performance.

Sliwa C., "SSD TRIM," 2018, 4 Pages, Retrieved from the Internet: URL:https://www.techtarget.com/searchstorage/definition/TRIM.

* cited by examiner

MANAGING TRIM COMMANDS IN A MEMORY SUB-SYSTEM

RELATED APPLICATIONS

The present application is a continuation of co-pending U.S. patent application Ser. No. 17/462,629, filed on Aug. 31, 2021, which is incorporated herein by reference in its entirety for all purposes.

TECHNICAL FIELD

Embodiments of the disclosure relate generally to memory sub-systems, and more specifically, relate to managing trim commands in a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
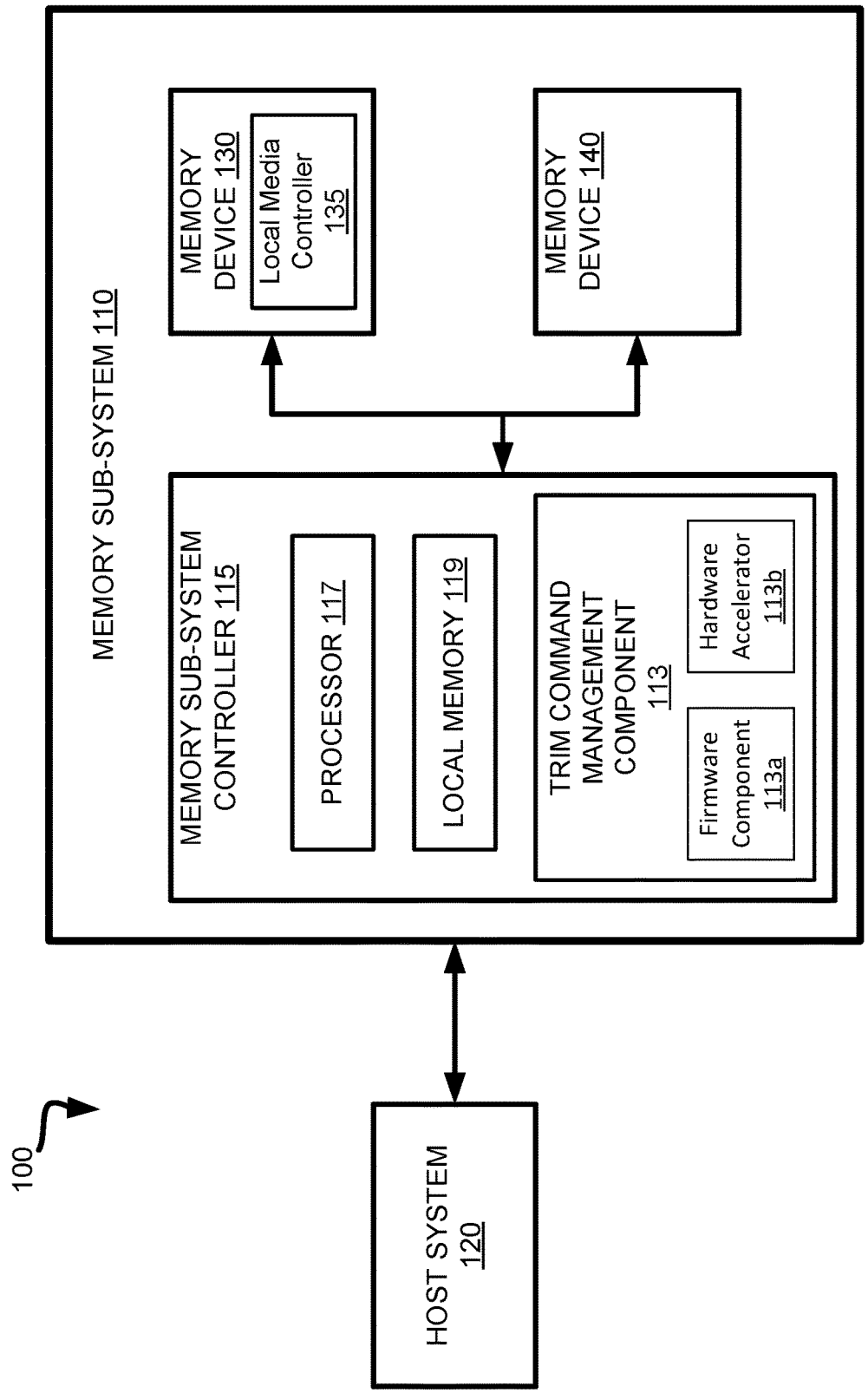
FIG. 1 illustrates an example computing system that includes a memory sub-system in accordance with some embodiments of the present disclosure.

Aspects of the present disclosure are directed to managing trim commands in a memory sub-system. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a negative-and (NAND) memory device. Another example of non-volatile memory devices is a three-dimensional cross-point ("3D cross-point") memory device that is a cross-point array of non-volatile memory that can perform bit storage based on a change of bulk resistance, in conjunction with a stackable cross-gridded data access array. Other examples of non-volatile memory devices are described below in conjunction with FIG. 1. A non-volatile memory device is a package of one or more dies. Each die can consist of one or more planes. For some types of non-volatile memory devices (e.g., NAND devices and 3D cross-point devices), each plane consists of a set of physical blocks. Each block consists of a set of pages. Each page consists of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values. In certain memory sub-systems, a memory device can include one or more units of memory. Each management unit can include one or more memory cells (e.g., a page, a block, or some other translation unit (TU)).

Host data is typically written to a memory sub-system at the page level, such that one or more pages are written in a single operation. When the memory sub-system is full, such that there is insufficient capacity to accept additional data from the host system, certain data can be erased in order to free up storage space. Conversely, data is typically erased from the memory sub-system at the block level, such that an entire block (including multiple pages) is erased in a single operation. However, an entire block cannot simply be erased as it may have one or more pages of valid data. A media management operation (e.g., a garbage collection process) can be performed for moving those pages that contain valid data to another block, so that the current block could be erased and rewritten. Garbage collection is a form of automatic memory management that attempts to reclaim memory occupied by stale data objects that are no longer in use (e.g., because they have been updated with new values). Garbage collection results in additional writes to the memory sub-system, which consumes resources that could otherwise be utilized to perform other operations, such as host-initiated operations.

Some memory sub-systems cannot identify the block with data no longer in use until the host system requests a write operation to be performed on that block. The memory sub-system can then erase the invalid data at the block (by performing garbage collection) before performing the write operation. This process consumes resources and affects the performance of the memory sub-system since the memory sub-system should wait until the garbage collection process erases the block before performing a requested write operation.

Some memory sub-systems perform trim operations to aid in the garbage collection process. A trim command is used by the host to inform the memory device of blocks that are no longer in use and can be erased internally, e.g., via a garbage collection process. Thus, the garbage collection process would be able to erase the blocks during any idle time of the memory sub-system (e.g., when there are no memory access operations such as write or read operations requested by the host system). In some memory sub-systems, a memory sub-system controller can indicate, in the logical block address (LBA) to physical block address (PBA) mapping table, that a certain management unit (MU) has blocks that are no longer in use. Thus, there would be no change to the data stored in the blocks (e.g., no write operation would need to be performed on the blocks). A trim operation would thus utilize fewer resources since the memory sub-system does not need to wait until a write operation is performed on a block in order to determine that the block contains some data that is no longer in use.

In certain memory sub-systems, the management units of the memory devices are grouped into larger groups of memory cells (e.g., super management units). The LBA to PBA mapping table would thus map, for each super management unit, its logical block address to a corresponding physical block address. The memory sub-system controller would not, therefore, be able to utilize the LBA to PBA mapping table for trim operations, since trim operations are done at the management unit level as discussed herein above, not the super management unit level. Consequently, the memory sub-system would need to perform a write operation to overwrite the management unit with the trim command.

Aspects of the present disclosure address the above and other deficiencies by providing a memory sub-system that manages trim commands on groups of memory cells in a memory device. In certain embodiments, a memory sub-system controller can receive a trim command. The trim command can reference a range of LBAs. The memory sub-system controller can identify a group of memory cells corresponding to the range of LBAs. The identified group of memory cells can include one or more management units. The memory sub-system controller can update a data structure (e.g., an L2P mapping table entry) associated with the group of memory cells to reference the trim command (e.g., by setting a bit flag to a value such as 1 to reference the trim command). In some embodiments, in responsive to updating the data structure, the memory sub-system controller can perform a trim operation specified by the trim command on the group of memory cells. At a later time, the memory sub-system controller can receive a memory access command (e.g., a write command) to be performed on the group of memory cells. Upon receiving the write command, the memory sub-system controller can determine that the data structure associated with the group of memory cells references the trim command. In response to determining that the data structure associated with the group of memory cells references the trim command, the memory sub-system controller can block the memory access command. In some embodiments, the memory sub-system controller can perform the trim operation on the group of memory cells. The memory sub-system controller can update the data structure to indicate the completion of the trim operation. In response to determining that the data structure indicates the completion of the trim operation, the memory sub-system controller can perform the memory access operation.

Advantages of the present disclosure include, but are not limited to, managing trim commands on groups of memory cells of a memory device of a memory sub-system without a decrease in performance and/or loss in efficiency. As discussed herein above, the current solutions in conventional memory sub-systems for trim commands can lead to performance issues when the LBA to PBA mapping is not done at the management unit level. In particular, the memory sub-system controller must overwrite each management unit with the trim command instead of only indicating in the LBA to PBA mapping table that the management unit has data no longer in use. This thus increases the amount of resources that would be required to perform a trim operation, resulting in a decrease in performance. Unlike in existing solutions, aspects of the present disclosure enable the memory sub-system to manage trim commands at the super management unit level so that the memory sub-system can process host system requests without waiting on write operations to be performed on management units for trim commands, thus improving the performance of the memory sub-system.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for media management within the same memory device package. An example of a managed memory device is a managed NAND (MNAND) device.

The memory sub-system 110 includes a trim command management component 113 that can manage trim commands for groups of memory cells of memory devices (e.g., the memory device 130). In some embodiments, the memory sub-system controller 115 includes at least a portion of the trim command management component 113. In some embodiments, the trim command management component 113 is part of the host system 110, an application, or an operating system. In other embodiments, local media controller 135 includes at least a portion of trim command management component 113 and is configured to perform the functionality described herein.

The trim command management component 113 can receive a trim command with respect to a memory device. The trim command can reference a range of LBAs. The trim command management component 113 can identify a group of memory cells corresponding to the range of LBAs. The identified group of memory cells can include one or more management units. The trim command management component 113 can update a data structure (e.g., an L2P mapping table entry) associated with the group of memory cells to reference the trim command (e.g., by setting a bit flag to a value such as 1 to reference the trim command) In some embodiments, in response to updating the data structure, the trim command management component 113 can perform a trim operation specified by the trim command on the group of memory cells. At a later time, the trim command management component 113 can receive a memory access command (e.g., a write command) from the host system to be performed on the group of memory cells. Upon receiving the memory access command, the trim command management component 113 can determine that the data structure associated with the group of memory cells references the trim command. In response to determining that the data structure associated with the group of memory cells references the trim command, the trim command management component 113 can block the memory access operation. The trim command management component 113 can perform the trim operation on the group of memory cells. The trim command management component 113 can update the data structure to indicate the completion of the trim operation. In response to determining that the data structure indicates the completion of the trim operation, the trim management component 113 can perform the memory access operation. Further details with regards to the operations of the trim command management component 113 are described below.

Figure 2:
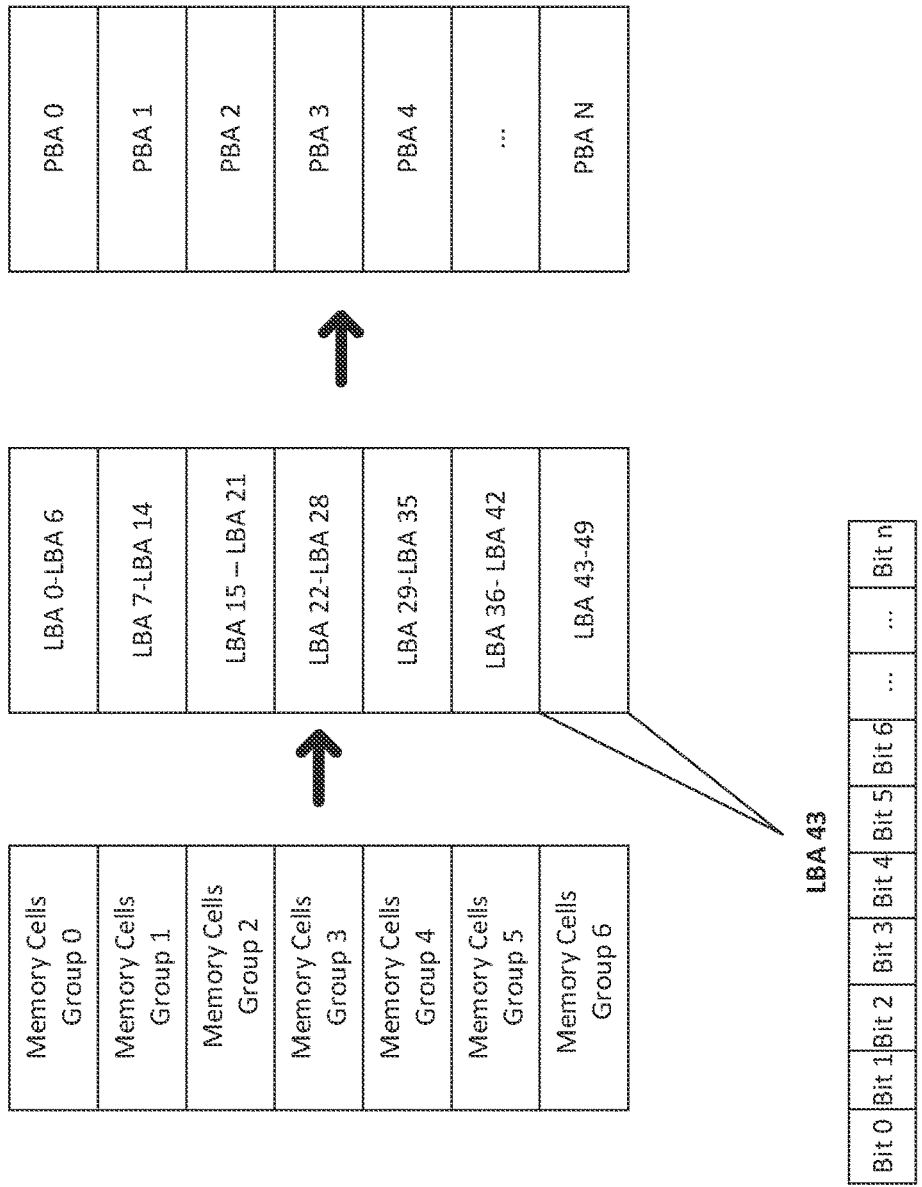
FIG. 2 illustrates an example logical block address to physical block address mapping table, in accordance with some embodiments of the present disclosure.

FIG. 2 illustrates an example LBA to PBA mapping table for a memory device, in accordance with embodiments of the disclosure. In one implementation, a LBA to PBA mapping table 201 can have multiple entries, where each entry corresponds to a group of memory cells (e.g., memory cells group 0, memory cells group 1, etc.). The group of memory cells can include one or more management units. Each management unit can include a set memory cells. For example, memory cells group 0 can include one or more management units corresponding to the range of LBAs, LBA 0 to LBA 6. LBA 0-6 can map to a set of PBA. In one implementation, each LBA address (e.g., LBA 43) is represented by a sequence of bits, as illustrated in FIG. 2. For example, the LBA 43 can include 32 bits. In some embodiments, one or more bits can serve as a flag set to a value to reference a trim command on a group of memory cells corresponding to the LBA. In some embodiments, one or more bits can serve as a flag set to another value to indicate the completion of a trim operation specified by the trim command on the group of memory cells. Further details with regards to the LBA to PBA mapping table are described below.

Figure 3:
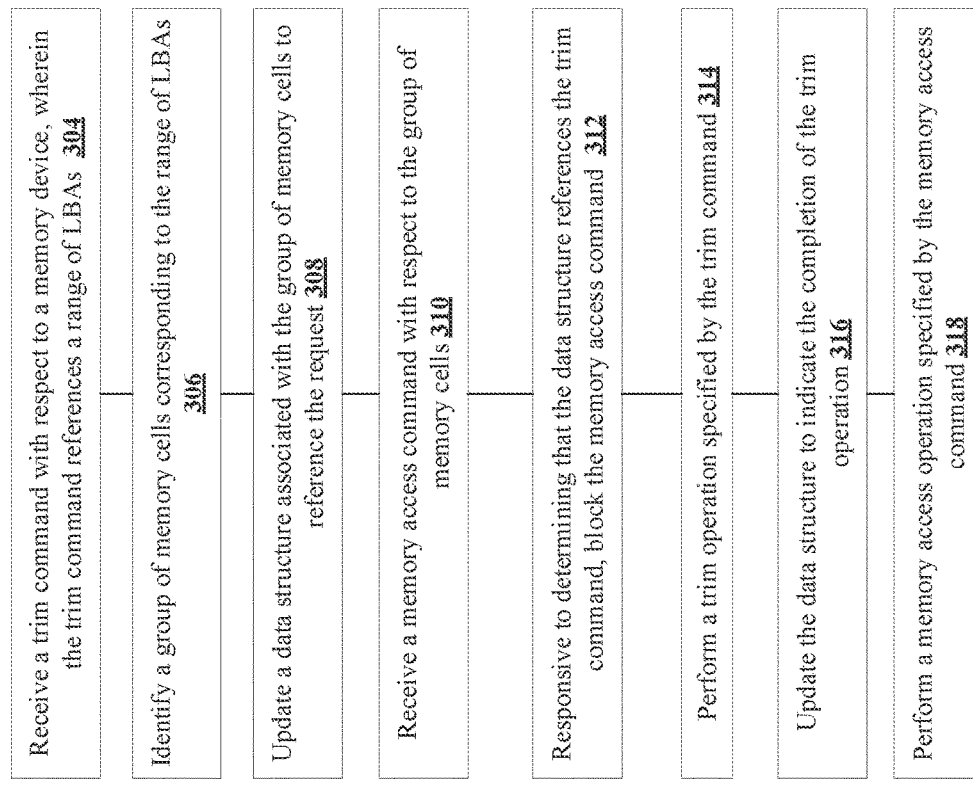
FIG. 3 is a flow diagram of an example method to manage trim commands for a memory device, in accordance with some embodiments of the present disclosure.

FIG. 3 is a flow diagram of an example method 300 to manage trim commands on a memory device, in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the write disturb management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 304, the processing logic receives a trim command on the memory device. In some embodiments, the trim command references a range of LBAs.

At operation 306, the processing logic identifies a group of memory cells corresponding to the range of LBAs. In some embodiments, identifying the group of memory cells corresponding to the range of LBAs can include identifying one or more LBAs corresponding to one or more management units (MUs) of the group of memory cells. In some embodiments, the processing logic can determine that the range of LBAs includes the one or more LBAs corresponding to the one or more MUs of the group of memory cells. For example, as illustrated in FIG. 2, the processing logic can identify a group of memory cells corresponding to the range of LBAs, LBA 0-LBA 6. According to FIG. 2, the group of memory cells corresponding to LBA 0-LBA 6 is memory cells group 0. In some embodiments, the processing logic can determine that the range of LBAs corresponds to a number of MUs less than the maximum number of MUs included in the group of memory cells. For example, as illustrated in FIG. 2, the processing logic can receive a trim command on a range of LBAs including LBA 0 to LBA 3. In this case, the range of LBAs does not include the entire range of LBAs (LBA 0-LBA 6) included in memory cells group 0. In some embodiments, in response to the processing logic determining that the range of LBAs corresponds to a number of MUs less than the maximum number of MUs included in the group of memory cells, the processing logic can perform a trim operation specified by the trim command on the group of memory cells. In some embodiments, each MU can include a set of memory cells. Each group of memory cells can include one or more MUs.

At operation 308, the processing logic updates a data structure to reference the trim command. In some embodiments, the data structure is associated with the group of memory cells. In some embodiments, updating the data structure includes updating an entry of the data structure associated with the group of memory cells. In some embodiments, updating the data structure to reference the trim command includes setting a flag associated with an LBA of the group of memory cells to a value. In some embodiments, one or more bits of the LBA can serve as the flag. For example, the processing logic can set the flag to a fixed value such 1 to reference the trim command. In some embodiments, the data structure can be a mapping table (e.g., the LBA to PBA mapping table as illustrated in FIG. 2). In some embodiments, in responsive to updating the data structure, the processing logic can perform the trim operation specified by the trim command on the group of memory cells.

At operation 310, the processing logic receives a memory access command with respect to the group of memory cells. In some embodiments, the processing logic receives the memory access command from a host system. For example, the processing logic can receive a memory access command to perform a write operation on the group of memory cells.

At operation 312, the processing logic blocks the memory access operation. In some embodiments, the processing logic blocks the memory access operation in response to determining that the data structure references the trim command. The processing logic can determine that the data structure references the trim command by identifying whether a flag associated with an LBA of the group of memory cells is set to a value (e.g., a fixed value such a 1). In some embodiments, one or more bits of the LBA can serve as the flag.

At operation 314, the processing logic performs the trim operation specified by the trim command on the group of memory cells. In some embodiments, performing the trim operation on the group of memory cells includes identifying the one or more MUs of the group of memory cells corresponding to the range of LBAs. In response to identifying the one or more MUs of the group of memory cells corresponding to the range of LBAs, the processing logic can perform a write operation on the one or more MUs. In some embodiments, the trim operation is performed in response to a trim command received by a firmware component of the memory device. In some embodiments, the trim operation is performed by a hardware accelerator of the memory device. In some embodiments, performing the trim operation by the hardware accelerator can reduce the loading on the firmware component and increase the speed of performing the trim operation. In some embodiments, the processing logic determines that another memory access operation is being performed on the group of memory cells. In response to determining that the other memory access operation is being performed, the processing logic pauses the other memory access operation.

At operation 316, the processing logic updates the data structure to indicate the completion of the trim operation. In some embodiments, updating the data structure to indicate the completion of the trim operation can include updating the flag associated with an LBA of the group of memory cells to another value. For example, the processing logic can set the flag to a fixed value such as 0 to indicate the completion of the trim operation. In some embodiments, a notification is sent to the firmware component of the memory device indicating the completion of the trim operation.

At operation 318, the processing logic performs a memory access operation specified by the memory access command. In some embodiments, performing the memory access operation can be in response to determining that the data structure indicates the completion of the trim command. In some embodiments, performing the memory access operation can include unblocking the memory access command. In some embodiments, the processing logic can unblock the memory access command in response to determining that the data structure indicates the completion of the trim operation. The processing logic can determine that the data structure indicates the completion of the trim operation by identifying whether the flag associated with an LBA of the group of memory cells is set to a certain value (e.g., a fixed value such as 0). In some embodiments, the firmware component of the memory device can issue a request to unblock the memory access command in response to receiving the notification at operation 316 indicating the completion of the trim operation. In response to unblocking the memory access command, the processing logic can determine that the memory access command does not correspond to the range of LBAs associated with the trim command. For example, the processing logic can identify whether the flag associated with the LBA of the group of memory cells is set to the certain value (e.g., a fixed value such as 0). In some embodiments, the processing logic can determine that the memory access command is not associated with a block (e.g., identify that the memory access command was not blocked or has been unblocked). In response to determining that the memory access command is not associated with the block, the processing logic can perform the memory access operation. In some embodiments, performing the memory access operation can include performing, e.g., a write operation on the group of memory cells.

Figure 4:
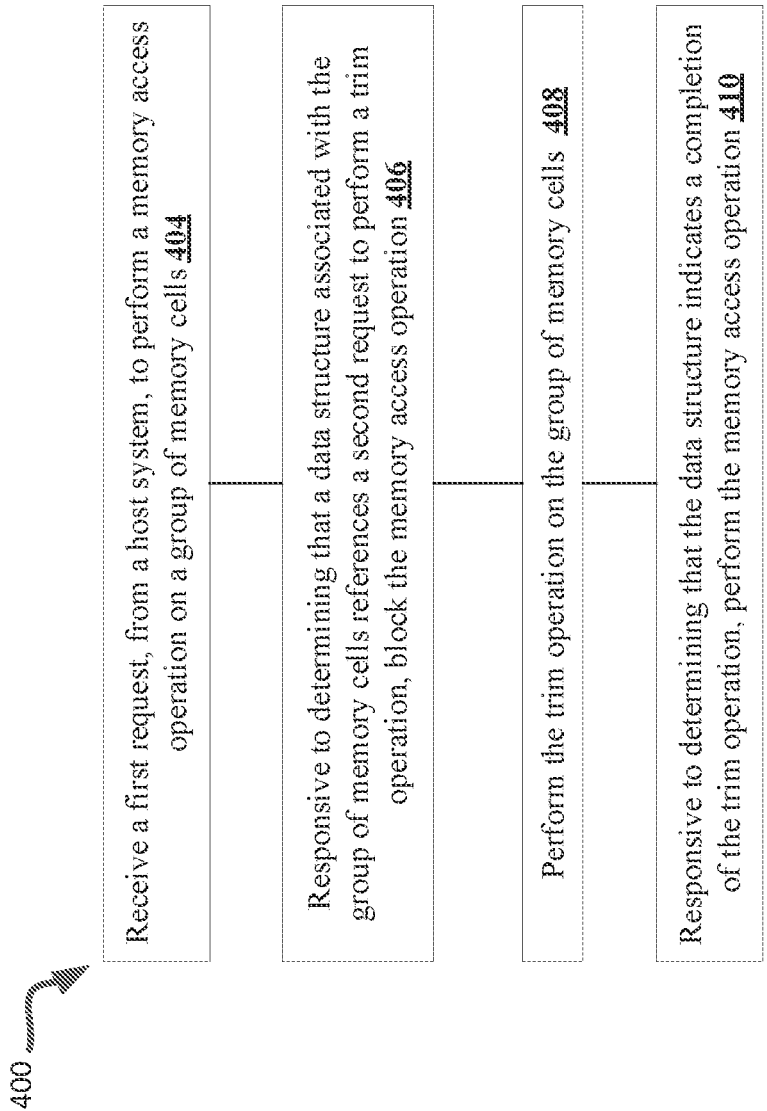
FIG. 4 is a flow diagram of an example method to manage trim commands for a memory device, in accordance with some embodiments of the present disclosure.

FIG. 4 is a flow diagram of an example method 400 to manage trim commands on a memory device, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the write disturb management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 404, the processing logic receives a request to perform a memory access operation on a group of memory cells of the memory device. In some embodiments, the processing logic receives the request to perform the memory access operation from the host system. In some embodiments, each group of memory cells can include one or more management units (MUs). Each MU can include a set of memory cells.

At operation 406, the processing logic blocks the memory access operation. In some embodiments, the processing logic blocks the memory access operation in response to determining that a data structure associated with the group of memory cells references another request to perform a trim operation. The processing logic can determine that the data structure references the other request to perform the trim operation by identifying whether a flag associated with an LBA of the group of memory cells is set to a value (e.g., a fixed value such a 1). In some embodiments, one or more bits of the LBA of the group of memory cells can serve as the flag.

At operation 408, the processing logic performs the trim operation on the group of memory cells. In some embodiments, the processing logic performs the trim operation in response to receiving the other request to perform the trim operation described at operation 406. The other request to perform the trim operation references a range of LBAs. In some embodiments, the processing logic identifies the group of memory cells corresponding to the range of LBAs. In some embodiments, identifying the group of memory cells corresponding to the range of LBAs can include identifying one or more LBAs corresponding to one or more MUs of the group of memory cells. In some embodiments, the processing logic can determine that the range of LBAs includes the one or more LBAs corresponding to the one or more MUs of the group of memory cells. In some embodiments, the processing logic updates the data structure associated with the group of memory cells to reference the other request to perform the trim operation. In some embodiments, updating the data structure includes updating an entry of the data structure. In some embodiments, updating the data structure to reference the other request to perform the trim operation includes setting the flag associated with an LBA of the group of memory cells to a value. For example, the processing logic can set the flag to a fixed value such 1 to reference the other request to perform the trim operation. In some embodiments, the data structure can be a mapping table (e.g., the LBA to PBA mapping table as illustrated in FIG. 2). In some embodiments, performing the trim operation on the group of memory cells includes identifying the one or more MUs of the group of memory cells corresponding to the range of LBAs. In response to identifying the one or more MUs of the group of memory cells corresponding to the range of LBAs, the processing logic can perform a write operation on the one or more MUs. In some embodiments, the trim operation is performed in response to receiving the other request to perform the trim operation by a firmware component of the memory device. In some embodiments, the trim operation is performed by a hardware accelerator of the memory device. In some embodiments, performing the trim operation by the hardware accelerator can reduce the loading on the firmware component and increase the speed of performing the trim operation. In some embodiments, the processing logic determines that another memory access operation is being performed on the group of memory cells. In response to determining that the other memory access operation is being performed, the processing logic pauses the other memory access operation.

Further at operation 408, in response to performing the trim operation, the processing logic can update the data structure to indicate the completion of the trim operation. In some embodiments, updating the data structure to indicate the completion of the trim operation can include updating the flag associated with an LBA of the group of memory cells to another value. For example, the processing logic can set the flag to a fixed value such as 0 to indicate the completion of the trim operation. In some embodiments, a notification is sent to the firmware component of the memory device indicating the completion of the trim operation.

At operation 410, the processing logic performs the memory access operation. In some embodiments, the processing logic performs the memory access operation in response to determining that the data structure indicates a completion of the trim operation. In some embodiments, performing the memory access operation can include unblocking the memory access operation. In some embodiments, the processing logic can unblock the memory access operation in response to determining that the data structure indicates the completion of the trim operation. The processing logic can determine that the data structure indicates the completion of the trim operation by identifying whether the flag associated with an LBA of the group of memory cells is set to a certain value (e.g., a fixed value such as 0). In some embodiments, the firmware component of the memory device can issue a request to unblock the memory access operation in response to receiving the notification at operation 408 indicating the completion of the trim operation. In response to unblocking the memory access operation, the processing logic can determine that the memory access operation does not correspond to the range of LBAs associated with the trim operation. For example, the processing logic can identify whether the flag associated with the LBA of the group of memory cells is set to the certain value (e.g., a fixed value such as 0). In some embodiments, the processing logic can determine that the memory access operation is not associated with a block (e.g., identify that the memory access operation was not blocked or has been unblocked). In response to determining that the memory access operation is not associated with the block, the processing logic can perform the memory access operation. In some embodiments, performing the memory access operation can include performing, e.g., a write operation on the group of memory cells.

Figure 5:
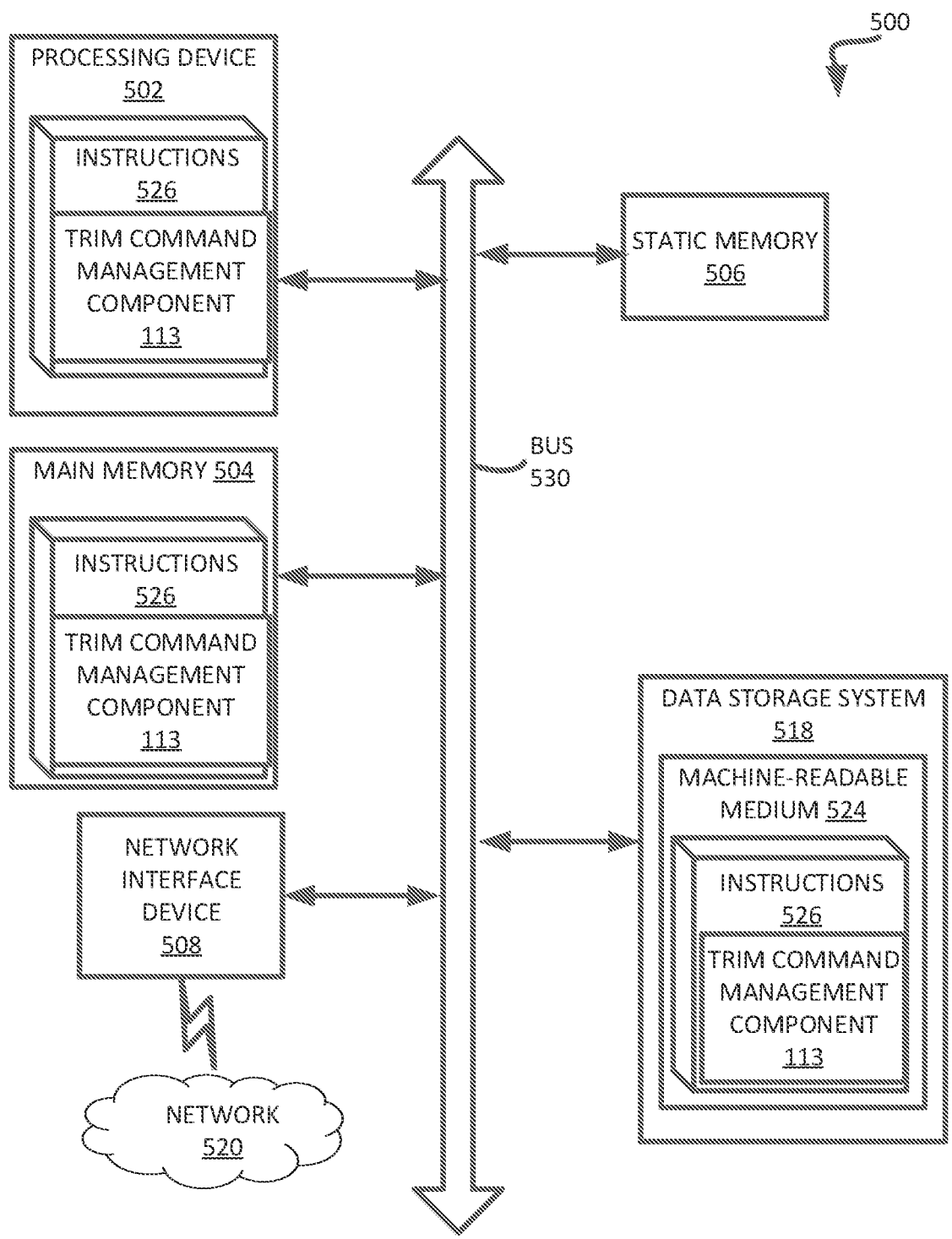
FIG. 5 is a block diagram of an example computer system in which embodiments of the present disclosure may operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the write disturb management component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or RDRAM, etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 604 can correspond to the memory sub-system 110 of FIG. 1.

In one embodiment, the instructions 526 include instructions to implement functionality corresponding to a trim command management component (e.g., the trim command management component 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising: a memory device; and
a processing device, operatively coupled with the memory device, to perform operations comprising:
identifying a group of memory cells corresponding to a first range of logical block addresses (LBAs);
receiving a memory access command with respect to the group of memory cells;
responsive to determining that a data structure associated with the group of memory cells references a trim command, blocking the memory access command, wherein the trim command is directed to a second range of LBAs;
responsive to determining that the second range of LBAs corresponds to a number of management units (MUs) less than a maximum number of MUs included in the group of memory cells, performing, on the group of memory cells, a trim operation, wherein the maximum number of MUs included in the group of memory cells corresponds to the first range of LBAs;
responsive to determining that the data structure indicates a completion of the trim operation, performing a memory access operation specified by the memory access command.

2. The system of claim 1, wherein the processing device is to perform operations further comprising:
receiving, by the processing device, a trim command with respect to the memory device, wherein the trim command references the first range of LBAs.

3. The system of claim 2, wherein the processing device is to perform operations further comprising:
updating the data structure associated with the group of memory cells to reference the trim command, wherein updating the data structure comprises setting, to a first value, a flag associated with the group of memory cells.

4. The system of claim 3, wherein the processing device is to perform operations further comprising:
updating the data structure associated with the group of memory cells to indicate the completion of the trim operation, wherein updating the data structure comprises updating, to a second value, the flag associated with the group of memory cells.

5. The system of claim 1, wherein the trim operation on the group of memory cells is performed by a hardware accelerator.

6. The system of claim 1, wherein performing the trim operation on the group of memory cells comprises:
identifying one or more management units (MUs) of the group of memory cells corresponding to the first range of LBAs; and
performing a write operation on the one or more MUs.

7. The system of claim 1, wherein performing the memory access operation comprises: responsive to determining that the data structure associated with the group of memory cells
indicates the completion of the trim operation, unblocking the memory access command, and performing the memory access operation.

8. A method comprising:
identifying, by a processing device, a group of memory cells corresponding to a first range of logical block addresses (LBAs) of a memory device;
receiving a memory access command with respect to the group of memory cells;
responsive to determining that a data structure associated with the group of memory cells references a trim command, blocking the memory access command, wherein the trim command is directed to a second range of LBAs;
responsive to determining that the second range of LBAs corresponds to a number of management units (MUs) less than a maximum number of MUs included in the group of memory cells, performing, on the group of memory cells, a trim operation, wherein the maximum number of MUs included in the group of memory cells corresponds to the first range of LBAs; and
responsive to determining that the data structure indicates a completion of the trim operation, performing a memory access operation specified by the memory access command.

9. The method of claim 8, further comprising:
receiving, by the processing device, a trim command with respect to the memory device, wherein the trim command references the first range of LBAs.

10. The method of claim 9, further comprising:
updating the data structure associated with the group of memory cells to reference the trim command, wherein updating the data structure comprises setting, to a first value, a flag associated with the group of memory cells.

11. The method of claim 10, further comprising:
updating the data structure associated with the group of memory cells to indicate the completion of the trim operation, wherein updating the data structure comprises updating, to a second value, the flag associated with the group of memory cells.

12. The method of claim 8, wherein the trim operation on the group of memory cells is performed by a hardware accelerator.

13. The method of claim 8, wherein performing the trim operation on the group of memory cells comprises:
identifying one or more management units (MUs) of the group of memory cells corresponding to the first range of LBAs; and
performing a write operation on the one or more MUs.

14. The method of claim 8, wherein performing the memory access operation comprises: responsive to determining that the data structure associated with the group of memory cells
indicates the completion of the trim operation, unblocking the memory access command, and
performing the memory access operation.

15. A non-transitory computer-readable storage medium comprising instructions that, when executed by a processing device, cause the processing device to perform operations comprising:
identifying a group of memory cells corresponding to a first range of logical block addresses (LBAs) of a memory device;
receiving a memory access command with respect to the group of memory cells;
responsive to determining that a data structure associated with the group of memory cells references a trim command, blocking the memory access command, wherein the trim command is directed to a second range of LBAs;
responsive to determining that the second range of LBAs corresponds to a number of management units (MUs) less than a maximum number of MUs included in the group of memory cells, performing, on the group of memory cells, a trim operation, wherein the maximum number of MUs included in the group of memory cells corresponds to the first range of LBAs; and
responsive to determining that the data structure indicates a completion of the trim operation, performing a memory access operation specified by the memory access command.

16. The non-transitory computer-readable storage medium of claim 15, wherein the processing device is to perform operations further comprising:
receiving, by the processing device, a trim command with respect to the memory device, wherein the trim command references the first range of LBAs.

17. The non-transitory computer-readable storage medium of claim 16, wherein the processing device is to perform operations further comprising:
updating the data structure associated with the group of memory cells to reference the trim command, wherein updating the data structure comprises setting, to a first value, a flag associated with the group of memory cells.

18. The non-transitory computer-readable storage medium of claim 17, wherein the processing device is to perform operations further comprising:
updating the data structure associated with the group of memory cells to indicate the completion of the trim operation, wherein updating the data structure comprises updating, to a second value, the flag associated with the group of memory cells.

19. The non-transitory computer-readable storage medium of claim 15, wherein performing the trim operation on the group of memory cells comprises:
- identifying one or more management units (MUs) of the group of memory cells corresponding to the first range of LBAs; and
- performing a write operation on the one or more MUs.

20. The non-transitory computer-readable storage medium of claim 15, wherein performing the memory access operation comprises:
- responsive to determining that the data structure associated with the group of memory cells indicates the completion of the trim operation, unblocking the memory access command, and
- performing the memory access operation.

* * * * *